(12) United States Patent
Weil et al.

(10) Patent No.: US 6,907,423 B2
(45) Date of Patent: Jun. 14, 2005

(54) SEARCH ENGINE INTERFACE AND METHOD OF CONTROLLING CLIENT SEARCHES

(75) Inventors: Frank L. Weil, Boulder, CO (US); Chadwick K. Boggs, Boulder, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 519 days.

(21) Appl. No.: 09/754,155

(22) Filed: Jan. 4, 2001

(65) Prior Publication Data

US 2003/0093409 A1 May 15, 2003

(51) Int. Cl.$^7$ .............................................. G06F 17/30
(52) U.S. Cl. ..................... 707/3; 707/2; 707/9; 707/10
(58) Field of Search ............................. 707/3, 2, 9, 10 707/5, 4, 104.1, 205

(56) References Cited

U.S. PATENT DOCUMENTS

| | | | |
|---|---|---|---|
| 5,802,524 A | | 9/1998 | Flowers et al. ............ 707/103 |
| 5,870,546 A | | 2/1999 | Kirsch ........................ 709/205 |
| 5,970,483 A | | 10/1999 | Evans ............................. 707/3 |
| 5,978,799 A | | 11/1999 | Hirsch ............................. 707/4 |
| 6,018,733 A | | 1/2000 | Kirsch et al. .................... 707/3 |
| 6,041,326 A | | 3/2000 | Amro et al. ................... 707/10 |
| 6,055,543 A | * | 4/2000 | Christensen et al. ...... 707/104.1 |
| 6,119,133 A | * | 9/2000 | Nusbickel et al. .......... 707/205 |
| 6,253,198 B1 | * | 6/2001 | Perkins ............................ 707/3 |
| 6,263,330 B1 | * | 7/2001 | Bessette ........................ 707/4 |
| 6,327,590 B1 | * | 12/2001 | Chidlovskii et al. ........... 707/5 |
| 6,360,205 B1 | * | 3/2002 | Iyengar et al. ................ 705/5 |
| 6,360,215 B1 | * | 3/2002 | Judd et al. ..................... 707/3 |
| 6,366,915 B1 | * | 4/2002 | Rubert et al. ................. 707/10 |
| 6,374,237 B1 | * | 4/2002 | Reese ............................ 707/3 |
| 6,460,029 B1 | * | 10/2002 | Fries et al. .................... 707/3 |
| 6,484,164 B1 | * | 11/2002 | Nikolovska et al. ........... 707/3 |
| 6,711,585 B1 | * | 3/2004 | Copperman et al. ...... 707/104.1 |

FOREIGN PATENT DOCUMENTS

| | | | | |
|---|---|---|---|---|
| WO | WO 00/51031 | * | 8/2000 | ........... G06F/17/30 |

* cited by examiner

*Primary Examiner*—Jean M. Corrielus
*Assistant Examiner*—Chongshan Chen
(74) *Attorney, Agent, or Firm*—Kent A. Lembke; William J. Kubida; Hogan & Hartson LLP

(57) ABSTRACT

A method for controlling access provided to content files during an information search initiated by a client device and performed by a search engine. The method includes receiving a search request from the client. A modified search request is generated by applying a search profile for the user of the client device to the received search request. The modified search request is then routed to the search engine to apply search criteria in the modified search request to search engine collections populated from the content files. The user's search profile includes restrictions defining which of the search engine collections can be searched and how such collections can be searched. The search profile may be generated at the time the search request is received based on login information for the user of the client and based on stored user profile or account information. According to this method, the client is not provided direct access to the search engine and is particularly useful in client-server environments, such as clients with browsers linked to the Internet that search networked devices for information.

13 Claims, 3 Drawing Sheets

SEARCH ENGINE INTERFACE AND METHOD OF CONTROLLING CLIENT SEARCHES

BACKGROUND OF THE INVENTION

1. Field of the Invention.

The present invention relates, generally, to search engines and search engine interface tools and methods, and, more particularly, to a system, method, and architecture for providing in the client-server environment of the Internet an interface between a client and a search engine to control the search process to selectively and restrictively provide the client and search engine with access to data files or content.

2. Relevant Background.

A significant and growing problem is the controlling or restricting of access to content provided on the Internet. One of the most prevalent uses of the Internet, e.g., the World Wide Web portion of the Internet, is searching for and quickly browsing information. Generally, an individual or user performs a search by using a client node (such as a personal computer, wireless device, and the like) with a browser application to link and communicate with content providers over the Internet. The user generally enters a search request that specifies their search criteria, such as by typing in search terms with Boolean logic or other symbols including "and," "or," "not," and the like, and a search engine then performs the search for the user. The search engine often includes a front end application or interface for receiving the search request and processing the search results into an expected or useful form including appropriate format and meeting communication protocols (e.g., Hyper-Text Transfer Protocol (HTTP)). Each interface is configured or adapted for communicating with only one of the many search engines, such as Ultraseek™, Webcrawler™, Excite™, Alta Vista™, and the like, and consequently, such interfaces are tied to a specific search engine and are not useful with more than one search engine.

Search engines are software applications or programs that return a list of Web sites or pages (or the Uniform Resource Locators (URLs) for those sites or pages) that match the criteria in the user's search request. The user can then select from the results in the list to hotlink to a particular Web site. Search engines typically maintain in separate storage or memory only a small subset of the content providers' information to quicken searching. In this regard, search engines first perform a process called spidering, indexing, or populating in which the search engine directly accesses the content providers' content files or databases, gathers and stores linking and summary information for searching and including in the results list, and indexes or tags the stored information into collections for later searching. Typically, the search engine has direct and complete access to all of the information in the content providers' files that are designated for viewing by one or more of the providers' customers. Because the search engine controls the information it collects from the content provider, the search engine also controls what information is provided to the user. Generally, once access is granted to a search engine, the user is allowed to freely search the entire contents of the search engine's collections, which corresponds to searching all of the information provided by the content provider.

However, there are many situations for which a content provider does not want searchers to have unlimited access to all of their content. For example, an online education service provider may offer numerous courses and have information for these courses stored in content files, but each student typically will only be registered for and have paid for a few of the courses. In this case, the education service provider only wants the student to be able to access information pertaining to the courses for which they have registered, not to all course content. Similarly, an entertainment service provider may offer many types of entertainment (such as audio, video, pictures, and the like) but would want to restrict a searcher to the information covered by their subscription. Another example includes content that is categorized into differing levels of security, e.g., public information, minimal security information, and high-level security information. In this case, the content provider may wish to allow any searcher to access the public information but place restrictions on access to the other types of information. Existing Web servers and search engines generally do not function to restrict a searcher's access to content based on the searcher's information (e.g., paid enrollment, paid subscription, security clearances, and the like). Instead, access to content is provided on an all or nothing basis.

Some content providers try to limit access by requiring users or searchers to successfully initiate a login session prior to searching content. For example, the host, e.g., a Web server, may execute a login procedure that matches the client (i.e., the searcher) and their identification information with an access control list. For example, students registered for an online class may be placed on an access control list for access as a student to a host Web server. However, once access is granted to the Web server, the searcher, e.g., the student, typically has access to all of the content serviced by the Web server and its associated search engine. Separate host servers, login sessions, and content databases can be provided to limit access, but this is often expensive and creates maintenance problems.

Accordingly, there remains a need for methods and systems for providing, on a selective and restrictive basis, access to a client or searcher to the content or information provided by content providers, e.g., direct access to the content is preferably blocked. Preferably, such a method or system would not be tied or locked to a single type of search engine or server configuration. Additionally, it is preferable that searchers be selectively provided access to content while still being allowed to perform searches in the manner they are accustomed, such as performing free form searches and the like, without knowledge of the restrictions (i.e., the search request is entered as in unrestricted search systems and the results appear unrestricted to the searcher).

SUMMARY OF THE INVENTION

The present invention addresses the above and other problems by providing an Internet-based search control system with a search engine interface that functions as a restrictive or protective layer between a search engine and the client or searching party. In a preferred embodiment, the search engine interface restricts access at the programmatic level, not merely at a user interface level, by limiting the client's access when the client initiates the search. Briefly, the search engine interface receives a search request, creates or retrieves a profile for the client, and modifies the search request with the profile to limit the client's search access. The modified search request is then passed by the interface to the search engine, which performs a search of its collections with the modified search request and returns the results to the search engine interface. The search engine interface parses the results to place the results in proper form for return to the client and may also modify the results to further limit what information is returned to the client. The search engine interface may provide another level of access control by initially controlling the populating or indexing of the search engine's collections by requiring that index requests and the indexing results be passed through the interface (i.e., the search engine is not provided direct access to the content files as is generally the case with search engine systems).

According to one aspect of the invention, the present invention provides a method for controlling access to content files during an information search initiated by a client device and performed by a search engine. The method includes receiving a search request from the client. A modified search request is then generated by applying a search profile for the user of the client device to the received search request. The modified search request is then routed to the search engine to apply search criteria in the modified search request to search engine collections populated from the content files. Significantly, the user's search profile includes restrictions (such as which courses a student is registered for) that define which of the search engine collections can be searched (such as only the collections pertaining to the registered courses). In one preferred embodiment, the search profile is generated at the time the search request is received based on login information for the user of the client and/or based on stored user profile or account information. According to this method, the client is not provided direct access to the search engine.

According to another aspect of the invention, a method is provided for restricting direct access to content files by a search engine and by a client during an information search initiated by the client and performed by the search engine. The method begins with positioning a search engine interface between the client and the search engine. The search engine interface is also positioned between the search engine and the content files. The method continues with receiving with the search engine interface an indexing request from the search engine for a set of information from the content files to populate search engine collections. The search engine interface operates to retrieve the requested set of information and then to modify the retrieved information (such as by removing metatags or adorning the information with additional information).

The modified set of information is then passed to the search engine for creating or populating the search engine collections used by the search engine during searches. The method continues with receiving at the search engine interface a search request from the client and then passing the search request to the search engine, which applies criteria in the search request to the search engine collections. To further limit access, the search engine interface may modify the received search request based on a client search profile, thereby defining select ones of the collections for use during the search by the search engine.

DETAILED DESCRIPTION OF THE PREFERRED EMBODIMENTS

The present invention is directed to an Internet-based search control system including a search engine interface for controlling client searches of a content provider's data or files. Generally, the search engine interface provides access control by functioning as a restrictive layer between the searching client and a search engine with its data collections. In this regard, the search engine interface controls the content of the search engine collections and also modifies the search request prior to passing it to the search engine to control which of the data collections maintained by the search engine the searcher can access. In this manner, direct access to the content is restricted for the searching client and for the search engine.

The invention is described mainly in terms of client-server communications on the Internet, including communications between a host Web server (e.g. an HTTP Web server or applications server) and a search engine, such as Ultraseek™, Webcrawler™, Excite™, Alta Vista™, and the like. Additionally, the Web server is described as supporting the Java™ programming language and, particularly, the Java™ Servlet API, with one embodiment of the search engine interface comprising a Java™ API (Application Programming Interface). While providing an easily described and understood working example of the invention, this specific example is not intended as a limitation. As will be recognized by those skilled in the computer arts, the invention is readily extendable to more general applications in which a client is attempting to access content stored and served by a computer device utilizing a search engine. Accordingly, such general applications of the invention are considered to be within the breadth of the following description.

Figure 1:
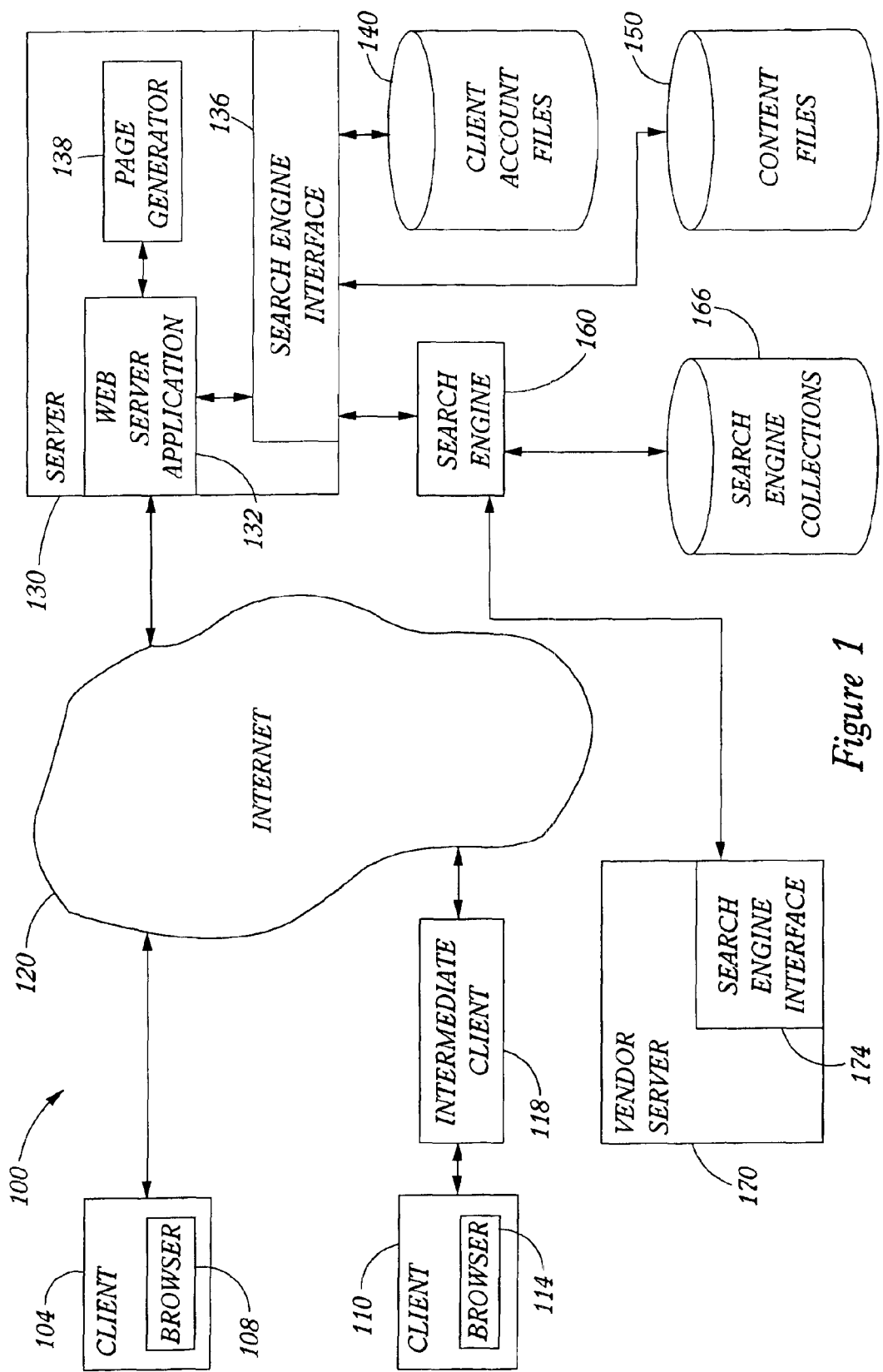
FIG. 1 is a block diagram of a network search control system in which a search engine interface according to the present invention is implemented.

FIG. 1 illustrates a simplified network search control system 100 in which the present invention is usefully employed. Clients 104, 110, such as personal computers or other electronic devices with displays, modems, and the like, are in communication via wired or wireless links with the Internet 120 or other data communications network. Although only two clients 104, 110 are shown, the search control system 100 could support numerous client devices. The clients 104, 110 include browsers 108, 114 (e.g., a Web browser such as Netscape Navigator™) to allow the user of the clients 104, 110 (i.e., the searchers) to communicate with (i.e., search) devices and networks linked to the Internet 120 for information. As illustrated, client 110 communicates first with an intermediate client 118, which is configured to add client profile information (as will be discussed in further detail) to search requests transmitted or issued by the client 110. For example, the client 118 may be a service provider (e.g., an ISP, subscription service, and the like) and add profile information that indicates which services the client 110 has subscribed or paid.

In operation, searchers operate the browsers 108, 114 to search for information stored on or served by devices, such as server 130, linked with the Internet 120. Preferably, the search requests are free format searches in which the searcher is allowed to search for documents that contain one or more words or phrases, such as all documents that include "applet" or "servlet" for a an online Java™ student. The search requests generally comply with or use HTTP or other protocol to make search requests for documents and to view search result lists (e.g., hyperlinks to HyperText Markup Language (HTML) and other mark up language documents and titles and summaries for the located documents). The browsers 108, 114 are also useful for responding to requests from contacted devices for additional information, including login identification information and the like.

The search control system 100 includes a server 130 (e.g., an HTTP Web server or applications server configured for, but not limited to, supporting Java™ including servlets and Java™ API) for communicating with the Internet 120 to receive search requests and return search results to the clients 104, 110. As illustrated, the Web server 130 includes a Web server application 132 for receiving search requests and routing the search requests to the search engine interface 136. The server 130 also includes a page generator 138 for dynamically generating a results page (e.g., an HTML or other mark up language document) including the search results for transmittal to the clients 104, 110.

The search engine interface 136 is a significant feature of the search control system 100. The search engine interface 136 functions as the restrictive layer between clients 104, 110 and the search engine 160. Additionally, the search engine interface 136 blocks direct access by the clients 104, 110 and the search engine 160 to the content files 150. The content files 150 include the content provided by a content provider (not shown) that is serviced by the server 130 (and although shown as one, independent device, the content files 150 may be stored in numerous varieties of data storage, including within the server 130). For example, the content files 150 may include all the information provided by an online educational service, such as information relevant to the courses provided by the service.

As discussed previously, it is preferable to be able to selectively allow clients 104, 110 (students in this example) to access the information. For example, clients 104, 110 may be restricted to access that portion of the content files 150 for which they have enrolled, subscribed, paid, and the like. The search engine interface 136 provides an access control function by intercepting and modifying search requests from the clients 104, 110 (and passed on by the Web server application 132). The search engine interface 136 is linked to the client account files 140 to retrieve information pertaining to the requesting client 104, 110 (and/or the user of the client 104, 110) and to retrieve or create a client search profile. The client search profile is utilized by the search engine interface 136 to modify the search request (e.g., indicate what collections the search is restricted to). The search engine interface 136 also controls search access by intercepting and modifying or filtering indexing requests by the search engine 160, thereby limiting the content that can be searched prior to receiving a search request.

During operation, the modified search requests are transmitted to the search engine 160 by the search engine interface 136. The search engine 160 uses the modified search requests to search the search engine collections 166. The results of the search are received by the search engine interface 136, processed to standardize the results, and passed to the Web server application 132. The Web server application 132 calls the page generator 138 to create a results page which is then transmitted by the Web server application 132 to the requesting client 104, 110 via the Internet 120.

FIG. 1 also illustrates that a vendor server 170 may directly communicate with the search engine 160 to perform searches of the search engine collections 166. Control over the access provided to the vendor server 170 is achieved by the search control system 100 by including a search engine interface 174 within the vendor server 170. The search engine interface 174 may be configured similar to search engine interface 136 to provide similar access control and restrictions or may readily contain different restrictions adapted specifically for the vendor server 170. Of course, the search engine collections 166 are populated with information from the content files 150, with population being controlled by the search engine interface 136. Hence, the search engine interface 136 provides a layer of access control even over the independent vendor server 170 by controlling the indexed information in the search engine collections 166.

Figure 2:
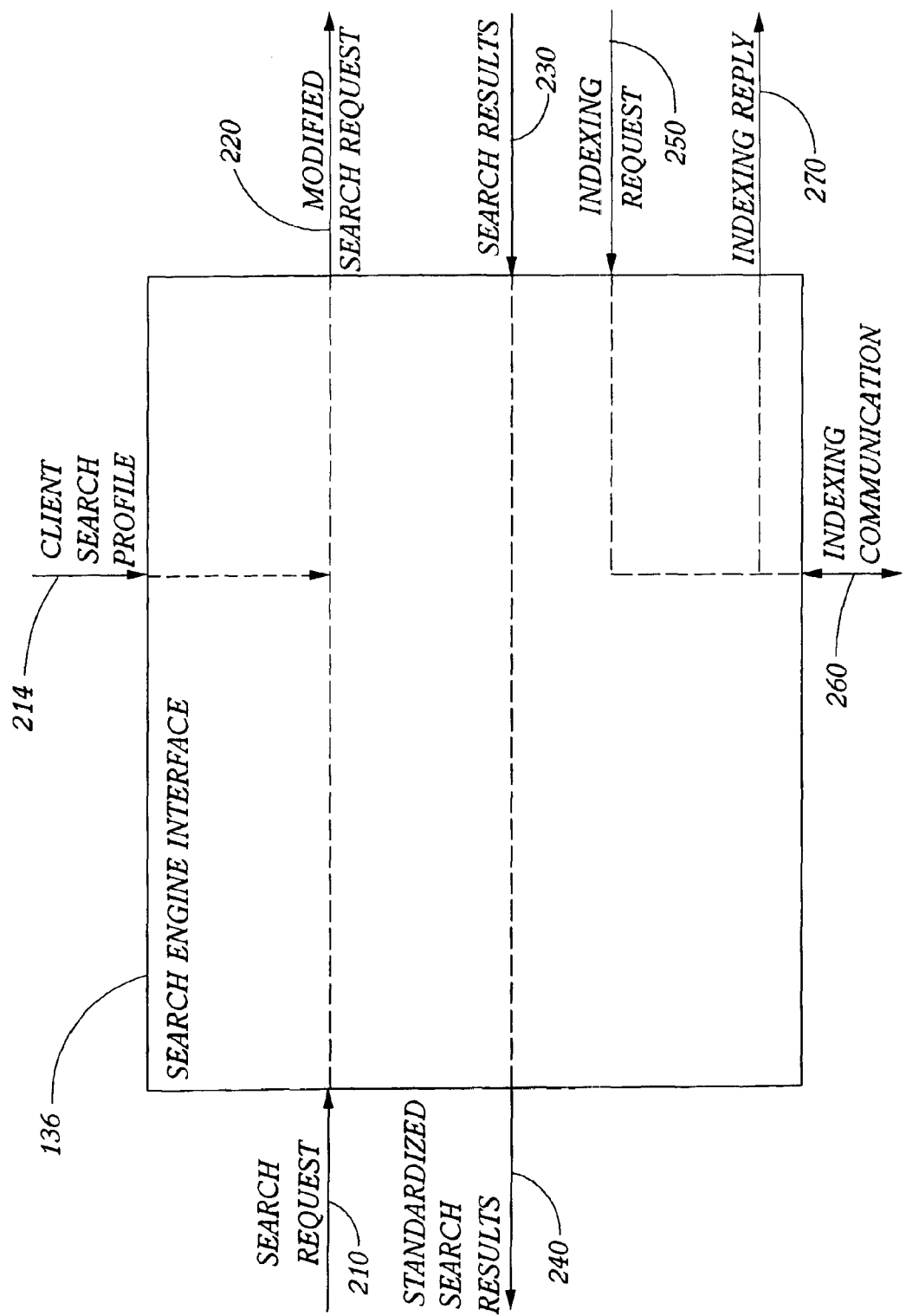
FIG. 2 is a data flow diagram illustrating schematically flow of information into and out of the search engine interface of FIG. 1.

With a general understanding of the components of the search control system 100 and the steps involved in a controlled search, it may be useful in more fully understanding the invention to discuss the operation of the search engine interface 136 in more detail. FIG. 2 illustrates with flow arrows the data or information that flows to and through the search engine interface 136. The search engine interface 136 performs important functions that allows it to protect the content files 150 from direct access while allowing the clients 104, 110 to freely search information for which they have rights or full access.

Referring to FIGS. 1 and 2, during operation, the search engine 160 first operates to populate the search engine collections 166, which are a subset of the information (such as titles, brief summaries, and link information) in the content files 150 that is indexed or sorted into collections for easier searching and retrieval. Briefly, a search request from a client 104, 110 will only be useful in locating information in the content files 150 if a link or other data representing that information is first placed in the search engine collections 166 by the search engine 160.

The search engine 160 initiates indexing or spidering by transmitting an indexing request 250 to the search engine interface 136 (no direct access provided). In one embodiment, the search engine interface 136 modifies the indexing request 250 and then calls and gathers the requested information in the indexing communication 260. The results are then transmitted to the search engine 160 in the indexing reply 270 for storage in the search engine collections 166. In another embodiment, the search engine interface 136 is configured to pass the indexing request 250 to the content files 150 to gather all the request information in the indexing communication 260. In this embodiment, the search engine interface 136 then acts to inspect the retrieved information and to modify the information by deleting information, adding additional information, or otherwise modifying the retrieved information. For example, the search engine interface 136 may remove select metatags from HTML documents, address information, or other specific information relating to documents in the content files 150. This modified information is then passed on to the search engine 160 in the indexing reply 270. In the above manner, the search engine interface 136 functions to limit or control access to the content files 150 by tightly controlling the populating of the search engine collections 166 (the information that is searched by the search engine 160), rather than allowing the search engine 160 full and direct access to the content files 150.

With the population or indexing step completed, the search process may continue with the transmittal of a search request 210 from the client 104, 110 to the server 130. The Web server application 132 passes the search request 210 to the search engine interface 136 for further processing. For example, if the user of the client 104, 110 is a student, the search may be for documents containing the word "applet." In HTTP format, the search request 210 may take the following form:
http://www.server130.com/pathinfo/query?qt=applet.

According to an important feature of the search engine interface 136, access to the search engine collections 166 is restricted by modifying the client-submitted search request 210 by utilizing information pertaining to the client 104, 110 (e.g., what courses are they enrolled in, what services have they subscribed to, what is their level of security, and other user-based criteria). This information can be formatted as a client search profile 214, which, as shown in FIG. 2, is added to the search request 210 to specify which of the collections in the search engine collections 166 can be searched with the modified search request 220. The modified search request 220 is then passed by the search engine interface 136 to the search engine 160. If a searcher has full access, no restrictions are added, but otherwise, limitations or restrictions are added to the search request 210 to form the modified search request 220. For example, if the collections represent online course information and the client 104, 110 has signed up for a course, the client search profile 214 may be formatted to identify a collection tagged with a keyword (i.e., an added search restriction). In the above example, the modified search request 220 with the addition of the client search profile 214 would then appear: http://www.server136.com/pathinfo/query?qt=applet&sid where "sid" stands for service identification (e.g., a tag label for the collection). The search engine 160 responds to this modified search request 220 having add-on restrictions by searching the collection with the "sid" tag. In this fashion, the search engine interface 136 effectively functions to provide selective access to the search engine collections 166 based on client or searcher information. The access control provided by the search engine interface 136 is provided in real time (at the time of receipt of the search request 210). Of course, the level of control may readily be changed over time, such as by changing the client search profile 214 or the information used to create the profile 214.

The client search profile 214 may be a previously created file or object (e.g., Java™ object) that is stored in the client account files 140 or the client search profile 214 can be dynamically created by the search engine interface 136 when the search request 210 is received by the search engine interface 136 based on information in the client account files 140. In either case, the search engine interface 136 first determines the identity of the client 104, 110. The searcher identification can be done by retrieving information contained in the search request 210, such as in a Cookie. Alternatively, the Web server application 132 may be configured to initiate a login procedure prior to accepting search requests 210. The client 104, 110 in this case will have entered identification information prior to the receipt of the search request 210 that allows the search engine interface 136 to retrieve a client search profile 214 from the client account files 140 or to create a client search profile 214 with information in the client account files 140 pertaining to the logged-in client 104, 110.

Alternatively, the search profile 214 may be passed into the search engine interface 136 with the search request 210. For client 104, this allows the client 104 to specify which collections they have access to search. This, however, only provides limited access control (by controlling the populating of the search engine collections 166). For client 110, the search request 210 may be modified to include the search profile 214 by the intermediate client 118. For example, the intermediate client 118 may be a subscription service provider, ASP, or ISP, and may desire to intercept all search requests 210 to monitor and control searching activities of its subscribers by adding, when appropriate, a restrictive add-on to limit access to the content provided by the server 130.

In the above examples, the modified search request 220 is created by adding on a restrictive term (i.e., the client search profile 214) to the search request 210. In an alternative embodiment, the search engine interface 136 is configured to be context sensitive to modify the search terms in the search request 210 to better suit information in the content files 150 or to control access. For example, the search engine interface 136 may be linked to a glossary database (not shown) that includes listing of terms used in the content files 150 that are similar to those that may be submitted by the clients 104, 110. In this example, the client may submit "server application" and the glossary database may include the term "servlet" for this phrase. The server engine interface 136 may be configured to replace the submitted search term with the more appropriate (e.g., accurate) search term. In more general terms, the search engine interface 136 is functional to control access to the search engine collection by modifying the received search request 210 in numerous ways to restrict access and/or to improve the searching efficiency.

According to another significant feature of the search engine interface 136, the modified search request 220 is formatted by the search engine interface 136 to suit the particular search engine 160 included in the search control system 100. Preferably, the search engine interface 136 is interchangeable and is not tied to a specific search engine specification. In this regard, the search engine interface 136 in one embodiment is adapted for modifying the received search request 210 into a modified search request 220 based on the search engine 160. For example, the search engine 160 may be Ultraseek™, Webcrawler™, Excite™, Alta Vista™, or any number of other search engines. The search engine interface 136 preferably includes applications or instances of classes that enable the search engine interface 136 to determine the type of search engine 160 and then communicate the modified search request 220 in a format acceptable to search engine 160. Alternatively, the search engine interface 136 may be initialized upon installation in the server 130 to include applications or instances of classes configured for the search engine 160. For example, when search engine 160 is an Ultraseek™ search engine, an instance of a search engine class can readily be constructed to allow reformatting of the search request 210 into a modified search request 220 recognized by the search engine 160.

Referring again to FIG. 2, in response to the modified search request 220, the search engine 160 searches the search engine collections 166 and returns the search results 230 to the search engine interface 136. For example, the results may be a list or an array of files or objects containing the link and summary information for matching documents in the content files 150. Typically, the search results 230 are in a format that is not standardized for transmittal to the clients 104, 110 and/or that is specific to the search engine 160.

To address this issue, the search engine interface 136 preferably is configured to modify the search results 230 into a more standard form and to transmit the standardized search results 240 to the Web server application 132 for use in generating a results page (e.g., an HTML document) with page generator 138. For example, the search engine interface 136 may include a parser application to parse the "raw" search results into a standard format. In this example, the search results 230 may be in HTTP format, and the search engine interface 136 may parse the search results 230 to place them into Java™ object form and pass these objects in standardized search results 240. The standardized search results 240 are then returned to the appropriate client 104, 110 by the Web server application 132.

Figure 3:
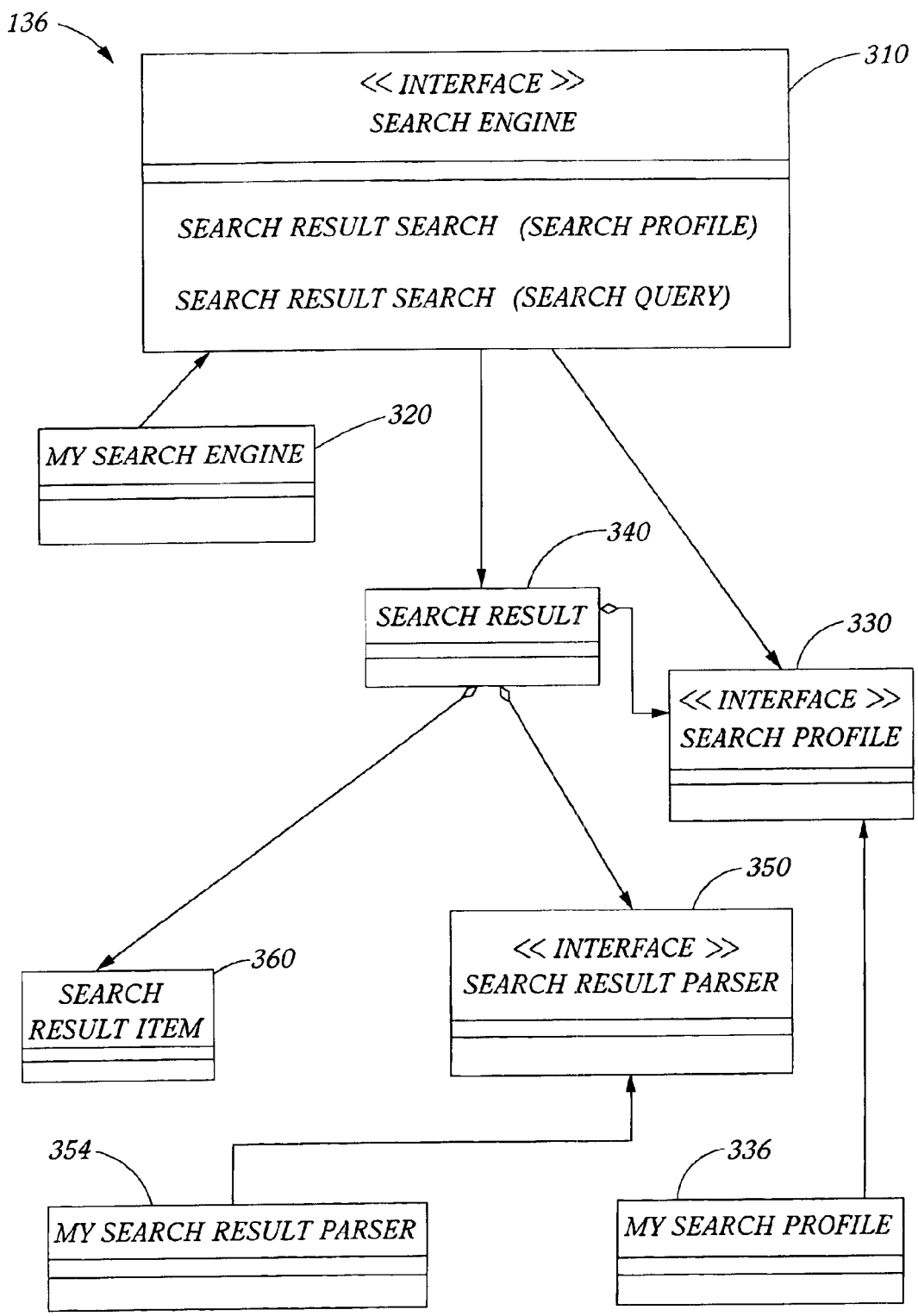
FIG. 3 illustrates a Java™ class diagram of one embodiment of the search engine interface of FIG. 1.

In a preferred embodiment illustrated in FIG. 3, the search engine interface 136 comprises a Java™ API that is useful in any server 130 which supports Java™ servlets, interfaces, and APIs. As shown in class diagram form, the search engine interface 136 includes a general search engine interface 310 with a specific instance or implementation labeled MySearchEngine 320. MySearchEngine 320 is an object that is specific to a particular search engine 160, such as Ultraseek™, to enable it to communicate with the search engine 160. With reference to FIGS. 2 and 3, during operation, a search request 210 is received at the search engine interface 136. In response, MySearchEngine 320 retrieves or creates client search profile 214 (if not provided in search request 210). As illustrated, the search engine interface 136 includes SearchProfile 330 (e.g., a Java™ interface) to create or instantiate an object or instance called MySearchProfile 336 with passed client information.

MySearchEngine 320 then creates modified search request 220 by calling an appropriate method to add MySearchProfile 336 to the search request 210 (or by other techniques discussed above). MySearchEngine 320 then functions to pass the modified search request 220 to the search engine 160 which searches the search engine collections 166 and returns search results 230. SearchResult 340 is then instantiated by MySearchEngine 320 and passed the set of raw results 230 to create the standardized search results 240 to pass to the Web server application 132. SearchResult 340 in turn calls or instantiates MySearchResultParser 354 which is an instance of interface SearchResultParser 350 that is specific to the search engine 160 (e.g., specific to Ultraseek™ or other utilized search engine configuration). MySearchResultParser 354 returns SearchResultItem 360, such as an array of results that are standard objects rather than search engine-specific results, which is then passed by the search engine interface 136 to the Web server application 132 to create with page generator 138 a results page (e.g., HTML document). The results page is then transmitted back to the client 104, 110 by the Web server application 132 via the Internet 120.

Although the invention has been described and illustrated with a certain degree of particularity, the present disclosure is by way of example, and numerous changes in the combination and arrangement of parts can be resorted to by those skilled in the art without departing from the spirit and scope of the invention, as hereinafter claimed. Control over search engine indexing is independent of the exemplary classes shown in FIG. 3, and numerous class configurations may be utilized to provide this functionality of the invention.

We claim:

1. A method for controlling access provided to a client to content files during an information search based on a client search profile, comprising:

receiving a search request from a client;

creating a modified search request by applying a search profile for the client to the received search request, wherein the creating of the modified search request includes generating the search profile based on stored information pertaining to the client, the generating includes accessing the stored information pertaining to the client using login information for the client, the login information being collected prior to the receiving of the search request; and routing the modified search request to a search engine having a search engine collections populated from the content files, wherein the applying of the search profile includes adding at least a portion of the search profile to the received search request to specify a set of the search engine collections to be searched by the search engine with the modified search request, and wherein the modified search request comprises the received search request and the portion of the search profile comprising a tag label of one of the search engine collections.

2. The method of claim 1, further including in response to routing the modified search request, receiving a set of search results in a format defined by the search engine and including standardizing the set of search results.

3. The method of claim 2, further including generating a results page including the standardized set of search results for transmittal to the client.

4. The method of claim 1, further including prior to the receiving of the search request, intercepting an indexing request from the search engine for a set of information from the content for the search engine collections and in response, returning to the search engine a modified form of the requested set of information.

5. A method for restricting direct access to content files by a search engine and a client during an information search initiated by the client and performed by the search engine, comprising:

positioning a search engine interface between the client and the search engine, wherein the search engine interface is also positioned between the search engine and the content files;

receiving with the search engine interface an indexing request from the search engine for a set of information from the content files;

operating the search engine interface to retrieve the set of information from the content files;

modifying content in the set of information from the content files with the search engine interface;

passing the modified set of information to the search engine for use in populating a search engine collections;

receiving at the search engine interface a search request from the client, wherein the received search request includes a client search profile defining select collections in the search engine collections for applying the search request;

modifying the search request by operating the search engine interface to add the client search profile to the received search request to identify select ones of the search engine collections for applying the search request; and routing the modified search request to the search engine for use in searching the search engine collections.

6. The method of claim 5, wherein the modifying includes removing metatags from at least a portion of the set of information.

7. The method of claim 5, wherein the modifying includes adding additional information to the set of information.

8. The method of claim 5, wherein the modifying the search request includes generating the client search profile including retrieving with the search engine interface user information for the client.

9. The method of claim 5, wherein the positioning includes constructing an instance of the search engine interface that is configured for communicating with the search engine.

10. A computer program for controlling access to content files during an information search initiated by a client and performed by a search engine, comprising:

first computer code devices configured to cause a computer to receive a search request from the client;

second computer code device configured to cause a computer to create a modified search request by applying a search profile for the client to the received search request, wherein the creating of the modified search request includes generating the search profile based on stored information pertaining to the client, the generating includes accessing the stored information pertaining to the client using login information for the client, the login information being collected prior to the receiving of the search request;

third computer code devices configured to cause a computer to route the modified search request to the search engine, the search engine being communicatively linked to a search engine collections populated with a set of information from the content files; and fourth computer code devices configured to cause a computer to intercept an indexing request from the search engine for information from the content files and to generate a restricted populating set of information by modifying results of the indexing request, wherein the search engine uses the restricted populating set of information to populate the search engine collections, and wherein the search profile defines select ones of the search engine collections for applying the modified search request during the information search.

11. The computer program of claim 10, further including fifth computer code devices configured to cause a computer to generate the search profile based on client information.

12. The computer program of claim 10, further including fifth computer code devices configured to cause a computer to receive a set of search results from the search engine and to parse the set of search results into a standardized act of search results for inclusion in a results page.

13. A method for concurrently restricting direct access to content files by a search engine and a client during an information search initiated by the client and performed by the search engine, comprising:

positioning a search engine interface between the client and the search engine, wherein the search engine interface is also positioned between the search engine and the content files;

receiving with the search engine interface an indexing request from the search engine for a set of information from the content files;

operating the search engine interface to retrieve the set of information from the content files;

modifying the retrieved set of information from the content files with the search engine interface to include service identifications;

passing the modified set of information to the search engine for use in populating a search engine collections;

receiving at the search engine interface a search request from the client, wherein the received search request includes a client search profile defining select collections in the search engine collections for applying the search request;

modifying the search request to add a particular service identification defined in the client search profile; and routing the modified search request to the search engine for use in searching the search engine collections, whereby the search engine compares the particular service identification to service identifications to select a subset of the search engine collections for use in the searching.

* * * * *

UNITED STATES PATENT AND TRADEMARK OFFICE
CERTIFICATE OF CORRECTION

PATENT NO. : 6,907,423 B2
DATED : June 14, 2005
INVENTOR(S) : Frank Weil

It is certified that error appears in the above-identified patent and that said Letters Patent is hereby corrected as shown below:

Column 11,
Line 31, "act" should be -- set --.

Signed and Sealed this

Sixth Day of September, 2005

JON W. DUDAS
*Director of the United States Patent and Trademark Office*